United States Patent
Khaykin et al.

(10) Patent No.: US 9,340,178 B1
(45) Date of Patent: May 17, 2016

(54) ADHESIVE VEHICLE FRONT END FOR MITIGATION OF SECONDARY PEDESTRIAN IMPACT

(71) Applicant: Google Inc., Mountain View, CA (US)

(72) Inventors: Alex Khaykin, San Francisco, CA (US); Daniel Lynn Larner, San Jose, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/539,533

(22) Filed: Nov. 12, 2014

Related U.S. Application Data

(60) Provisional application No. 61/911,853, filed on Dec. 4, 2013.

(51) Int. Cl.
*B60R 21/34* (2011.01)
*B60R 21/00* (2006.01)

(52) U.S. Cl.
CPC ......... *B60R 21/34* (2013.01); *B60R 2021/0004* (2013.01); *B60R 2021/346* (2013.01)

(58) Field of Classification Search
CPC .. B60R 21/00; B60R 21/34; B60R 2021/003; B60R 2021/0037; B60R 2021/343; B60R 2021/346
See application file for complete search history.

(56) References Cited

U.S. PATENT DOCUMENTS

| | | | |
|---|---|---|---|
| 6,447,049 B1 * | 9/2002 | Tohda et al. | 296/180.1 |
| 6,746,074 B1 * | 6/2004 | Kempf et al. | 296/187.04 |
| 7,757,804 B1 * | 7/2010 | Li | 180/274 |
| 8,191,666 B2 | 6/2012 | Suzuki et al. | |
| 2004/0130167 A1 * | 7/2004 | Mori et al. | 293/102 |
| 2006/0186702 A1 * | 8/2006 | Kisanuki et al. | 296/187.04 |
| 2010/0108424 A1 * | 5/2010 | Suzuki et al. | 180/232 |

FOREIGN PATENT DOCUMENTS

| | | |
|---|---|---|
| DE | 2804400 | 8/1979 |
| DE | 10059206 | 7/2002 |
| EP | 1476334 | 3/2007 |
| JP | 08183423 A * | 7/1996 |
| JP | 2009166548 | 7/2009 |

OTHER PUBLICATIONS

Machine Translation of JP08-183423. Retrieved Jun. 28, 2015.*

* cited by examiner

*Primary Examiner* — Barry Gooden, Jr.
(74) *Attorney, Agent, or Firm* — McDonnell Boehnen Hulbert & Berghoff LLP.

(57) ABSTRACT

A system for protecting a colliding object from a secondary impact, after an initial impact with a vehicle, including a vehicle having a front end, an adhesive layer positioned on the front end of the vehicle, a coating positioned over the adhesive layer, wherein, upon the initial impact between the colliding object and the vehicle, the coating is broken exposing the adhesive layer to adhere the colliding object to the adhesive layer during the initial impact.

19 Claims, 7 Drawing Sheets

ADHESIVE VEHICLE FRONT END FOR MITIGATION OF SECONDARY PEDESTRIAN IMPACT

BACKGROUND

Autonomous vehicles use various computing systems to aid in transporting passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

Motorized vehicles have been used for over 100 years to transport people and products from one location to another location. On occasion, an accident will occur, for a variety of reasons, where a vehicle will collide with another vehicle or object, or even a person. The collision may cause damage to the driven vehicle or the vehicle or object collided with, and may also cause injury to the occupants of the vehicle or the person collided with. As noted above, some vehicles have been equipped with autopilot systems, which permits the vehicle operator to switch from a manual mode to an autonomous mode or to modes that lie somewhere in between that may serve to prevent and/or reduce vehicle collisions.

As a result of the vehicle accidents that occasionally occur, in addition to the autopilot systems, certain protective features have been installed into vehicles. For example, automobiles have been structurally designed to meet certain crashworthiness standards to protect the occupants of a vehicle involved in a collision. In addition, bumpers have been installed on the front and rear of an automobile to prevent injury to the automobile in the event of a low speed collision. Vehicle bumpers are generally designed to absorb energy to prevent injury to the vehicle during a collision, but generally do not provide significant protection for a pedestrian struck by the vehicle.

Some efforts have been made to provide for the mitigation of injury to a pedestrian in a collision with a vehicle. Such systems include a deployable hood featured on certain Jaguar models which raise the hood a certain amount instantaneously upon impact, thus providing a more compliant surface for the pedestrian to impact. A similar technology featured on Volvo models in Europe deploys an airbag on the exterior of the vehicle at the base of the windshield meant to lessen the severity of the impact between the pedestrian's head and any portion of the vehicle. However, existing technology found in production vehicles does little to mitigate the secondary impact a pedestrian may experience after during a collision with a vehicle.

In the event of a collision between a vehicle and a pedestrian, injury to the pedestrian is often caused not only by the initial impact of the vehicle and the pedestrian, but also by the ensuing, secondary impact between the pedestrian and the road surface or other object. Specifically, when a pedestrian is in a collision with a vehicle, the nature of the collision causes the pedestrian to be carried along with the vehicle for a period of time. As this occurs, the kinetic energy of the moving vehicle accelerates the pedestrian to a certain velocity until the driver of the vehicle reacts to the accident by applying the brakes. At this point, the pedestrian continues travelling at the same velocity but is decoupled or "thrown" from the vehicle where a secondary impact occurs between the pedestrian and the road surface or other object. This secondary impact can often cause severe injuries to the pedestrian as the road surface or other object does not exhibit any sort of compliance or cushioning as the vehicle front end might.

SUMMARY

The present application discloses embodiments that relate to a system for protecting a pedestrian during impact with a vehicle. The system includes an adhesive layer that is positioned on the hood, front bumper, and/or front side panels of the vehicle. A protective coating is positioned over the adhesive layer. Upon impact with a pedestrian, the coating is broken exposing the adhesive layer. The adhesive bonds the pedestrian to the vehicle so that the pedestrian remains with the vehicle until it stops, and is not thrown from the vehicle, thereby preventing a secondary impact between the pedestrian and the road surface or other object.

In one aspect, a system for protecting a colliding object from a secondary impact, after an initial impact with a vehicle, is provided including a vehicle having a front end, an adhesive layer positioned on the front end of the vehicle, a coating positioned over the adhesive layer, wherein, upon the initial impact between the colliding object and the vehicle, the coating is broken exposing the adhesive layer to adhere the colliding object to the adhesive layer during the initial impact.

In another aspect, a method for protecting a colliding object from a secondary impact, after an initial impact with a vehicle, is provided including the steps of positioning an adhesive layer on a front end of the vehicle, positioning a coating over the adhesive layer, wherein the coating has thickness and strength such that the coating is broken upon the initial impact between the colliding object and the vehicle to expose the adhesive layer, and adhering the colliding object to the adhesive layer during the initial impact, thereby preventing the colliding object from suffering a secondary impact.

In a further aspect, a system for protecting a colliding object from a secondary impact after a collision with a vehicle is provided including means for adhering the colliding object to the vehicle during the collision to prevent the colliding object from being thrown from the vehicle and incurring a secondary impact with the road surface or other object.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
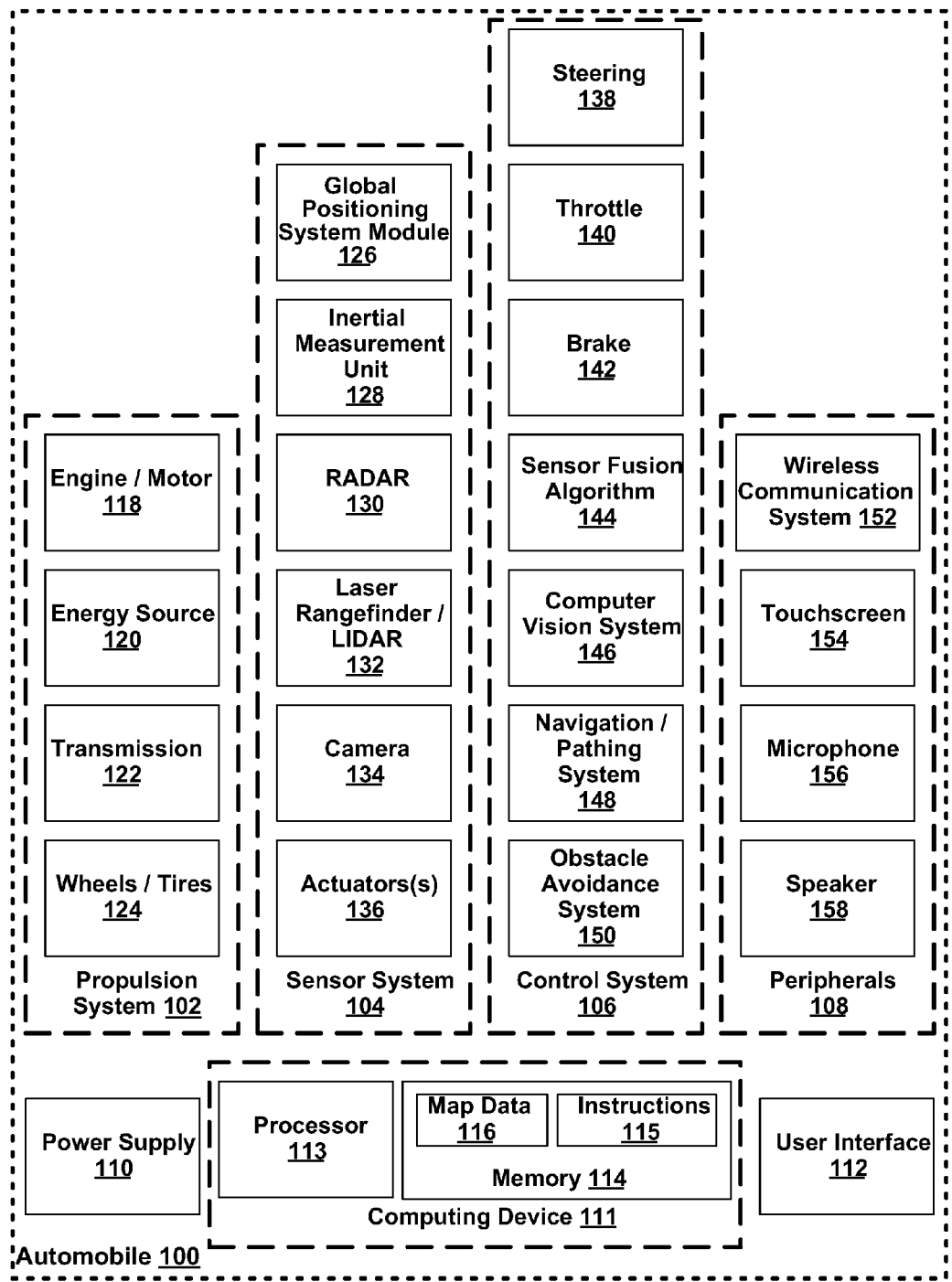
FIG. 1 is a simplified block diagram of an example automobile.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

There are continued efforts to improve vehicle safety, including the development of autonomous vehicle equipped with accident-avoidance systems that will have the ability to avoid all accidents. However, while such systems are being developed, it must be acknowledged that, on occasion, collisions between a vehicle and a pedestrian still occur. Therefore, it is desirable to provide safety mechanisms that reduce or prevent injury to a pedestrian when a collision between a pedestrian and a vehicle does occur. Such safety mechanisms may become unnecessary as accident-avoidance technology is being further developed, but at present it is desirable to provide vehicles with pedestrian safety mechanisms.

In view of the secondary injuries that a pedestrian may suffer during a collision with a vehicle, there is a need to provide a means for eliminating or reducing injury to a pedestrian that could be caused by a secondary impact between the pedestrian and the roadway surface or other object that may occur after the initial impact with the vehicle.

Example embodiments may be directed to a method and system that help to reduce, and hopefully prevent, the secondary impact of a pedestrian against a road surface or another object, which might otherwise occur when a pedestrian is involved in a collision with a moving vehicle. To do so, the front region of the vehicle may be coated with a specialized adhesive that adheres to a pedestrian, and thus holds the pedestrian on the vehicle in the unfortunate event that the front of the vehicle comes into contact with the pedestrian. The adhesion of the pedestrian to the vehicle may prevent the pedestrian from bouncing off the vehicle after the pedestrian impacts the hood. For example, by adhering the pedestrian that comes into contact with the front end, hood, and/or bumper, an example embodiment may prevent the pedestrian from bouncing forward off the front end, hood, and/or bumper, or being vaulted up and over the vehicle, thus helping to prevent injuries from a secondary impact with the road surface or other object that might otherwise occur.

Ideally, the adhesive coating on the front portion of the vehicle may be activated on contact and will be able to adhere to the pedestrian nearly instantaneously. This instantaneous or nearly-instantaneous action may help to constrain the movement of the pedestrian, who may be carried on the front end of the vehicle until the driver of the vehicle (or the vehicle itself in the case of an autonomous vehicle) reacts to the incident and applies the brakes. As such both the vehicle and pedestrian may come to a more gradual stop than if the pedestrian bounces off the vehicle.

In addition, the front portion of the vehicle may be protected from road debris, dirt, water, and other environmental factors by a thin coating applied over the adhesive layer. This "eggshell-like" material may also carry the aesthetic surface finish of the vehicle's exterior. However, this coating should instantaneously break away in the event of a pedestrian impact, revealing the adhesive layer below, and bonding to the pedestrian. In some embodiments a layer of air may be positioned between the adhesive layer and the thin, frangible coating. It is also desirable to have the adhesive coating release after a short period of time to allow for the removal of the pedestrian from the vehicle.

The use of an adhesive coating on the vehicle may further help to prevent or reduce the possibility of a "tertiary" impact in which a pedestrian who has already been involved in a vehicle collision and been vaulted a certain distance from the vehicle and impacted the roadway, once more collides with a nearby vehicle travelling in the vicinity (or possibly even the same vehicle). By adhering the pedestrian to the front of the vehicle, such a tertiary impact, which could lead to severe injury or even death, may be avoided, thus providing for additional pedestrian safety.

The embodiments of the adhesive coating disclosed herein may be used on any type of vehicle, including conventional automobiles and automobiles having an autonomous mode of operation. In some embodiments, the coating may be applied to an autonomous or semi-autonomous vehicle. However, the term "vehicle" is to be broadly construed to cover any moving object, whether or not motorized, and including a truck, bus, van, semi-trailer truck, motorcycle, golf cart, ATV, off-road vehicle, or farm vehicle, as well as a carrier that rides on a track such as a rollercoaster, trolley, tram, or train car.

Referring now to the Figures, FIG. 1 is a simplified block diagram of an example automobile 100, in accordance with an example embodiment. Components coupled to or included in the automobile 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the automobile 100. The memory 114 may include instructions 115 executable by the processor 113, and may also store map data 116. Components of the automobile 100 may be configured to work in an interconnected fashion with each other and/or with other components coupled to respective systems. For example, the power supply 110 may provide power to all the components of the automobile 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the automobile 100 may include more, fewer, or different systems, and each system may include more, fewer, or different components. Additionally, the systems and components shown may be combined or divided in any number of ways.

The propulsion system 102 may may be configured to provide powered motion for the automobile 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the automobile 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of automobile 100 could be configured in various formats, including a unicycle, bicycle/motorcycle, tricycle, or car/truck four-wheel format. Other wheel/tire formats are possible as well, such as those including six or more wheels. The wheels/tires 124 of automobile 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the automobile 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the automobile 100 (e.g., an $O_2$ monitor, a fuel gauge, an engine oil temperature, etc.). Other sensors are possible as well.

The GPS module 126 may be any sensor configured to estimate a geographic location of the automobile 100. To this end, the GPS module 126 may include a transceiver configured to estimate a position of the automobile 100 with respect to the Earth, based on satellite-based positioning data. In an example, the computing device 111 may be configured to use the GPS module 126 in combination with the map data 116 to estimate a location of a lane boundary on road on which the automobile 100 may be travelling on. The GPS module 126 may take other forms as well.

The IMU 128 may be any combination of sensors configured to sense position and orientation changes of the automobile 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the automobile 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, The LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the automobile 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the automobile 100 illuminates an object in the environment with a predetermined light pattern, such as a grid or checkerboard pattern and uses the camera 134 to detect a reflection of the predetermined light pattern off the object. Based on distortions in the reflected light pattern, the automobile 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the automobile 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the automobile 100.

The throttle 140 may be any combination of mechanisms configured to control the operating speed and acceleration of the engine/motor 118 and, in turn, the speed and acceleration of the automobile 100.

The brake unit 142 may be any combination of mechanisms configured to decelerate the automobile 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the automobile 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the automobile 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the automobile 100. The navigation and pathing system 148 may additionally be configured to update the driving path dynamically while the automobile 100 is in operation. In some examples, the navigation and pathing system 148 may be configured to incorporate data from the sensor fusion algorithm 144, the GPS module 126, and one or more predetermined maps so as to determine the driving path for the automobile 100.

The obstacle avoidance system 150 may be any system configured to identify, evaluate, and avoid or otherwise negotiate obstacles in the environment in which the automobile 100 is located.

The control system 106 may additionally or alternatively include components other than those shown.

Peripherals 108 may be configured to allow the automobile 100 to interact with external sensors, other automobiles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other automobiles, sensors, or other entities, either directly or via a communication network. To this end, the wireless communication system 152 may include an antenna and a chipset for communicating with the other automobiles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the automobile 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the automobile 100. Similarly, the speakers 158 may be configured to output audio to the user of the automobile 100.

The peripherals 108 may additionally or alternatively include components other than those shown.

The power supply 110 may be configured to provide power to some or all of the components of the automobile 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the automobile 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various automobile functions, including any of the functions or methods described herein.

The components of the automobile 100 could be configured to work in an interconnected fashion with other components within and/or outside their respective systems. To this end, the components and systems of the automobile 100 may be communicatively linked together by a system bus, network, and/or other connection mechanism (not shown).

Further, while each of the components and systems is shown to be integrated in the automobile 100, in some examples, one or more components or systems may be removably mounted on or otherwise connected (mechanically or electrically) to the automobile 100 using wired or wireless connections.

The automobile 100 may include one or more elements in addition to or instead of those shown. For example, the automobile 100 may include one or more additional interfaces and/or power supplies. Other additional components are possible as well. In these examples, the memory 114 may further include instructions executable by the processor 113 to control and/or communicate with the additional components.

Figure 2:
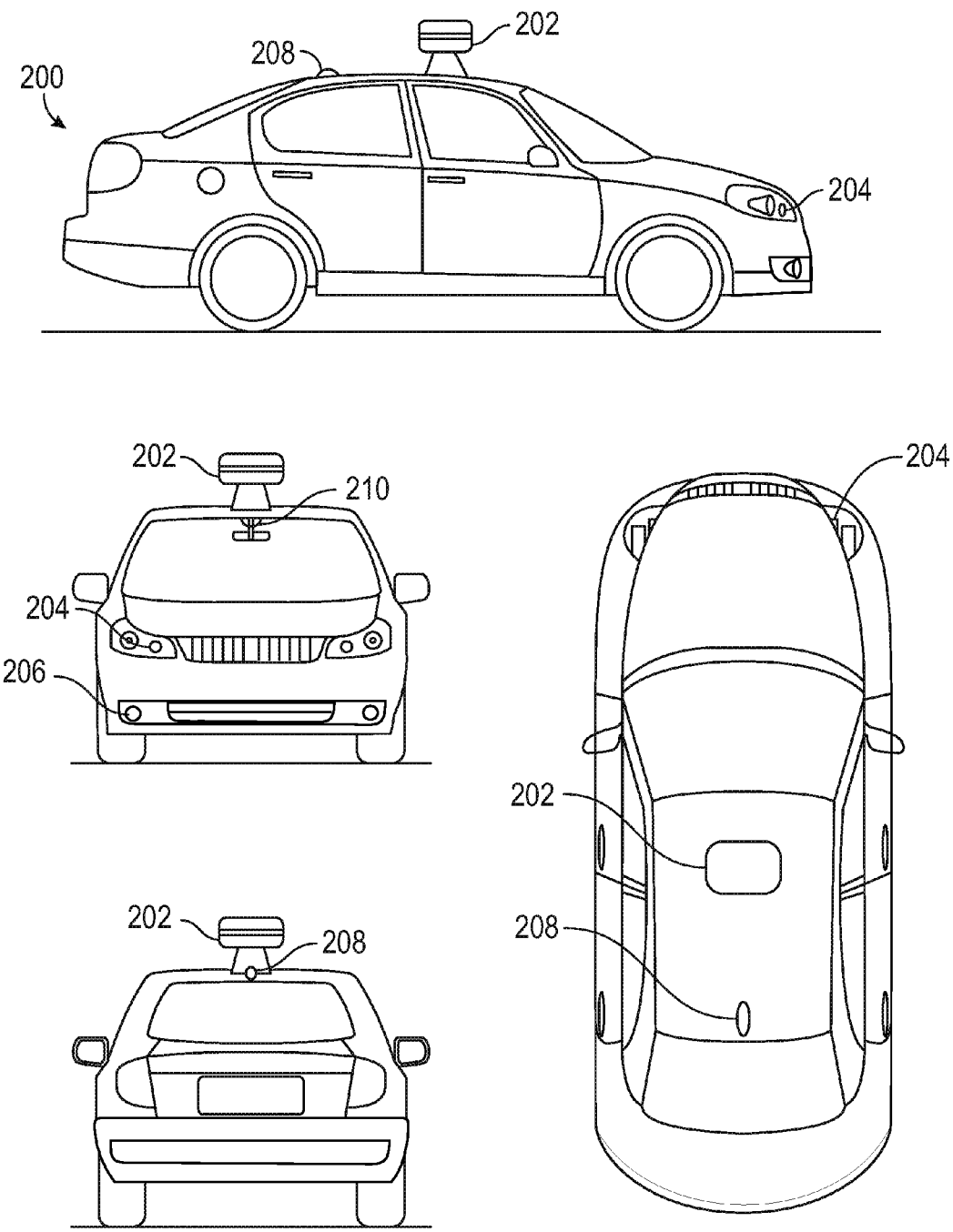
FIG. 2 illustrates an example automobile having an autonomous mode.

FIG. 2 illustrates an example automobile 200, in accordance with an embodiment. In particular, FIG. 2 shows a Right Side View, Front View, Back View, and Top View of the automobile 200. Although automobile 200 is illustrated in FIG. 2 as a car, other examples are possible. For instance, the automobile 200 could represent a truck, a van, a semi-trailer truck, a motorcycle, a golf cart, an off-road vehicle, or a farm vehicle, among other examples. As shown, the automobile 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the automobile 200, in some examples the sensor unit 202 may be mounted elsewhere on the automobile 200, either inside or outside the automobile 200. Further, while only three sensor units are shown, in some examples more or fewer sensor units may be included in the automobile 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the automobile 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other automobiles, sensors, or other entities, either directly or via a communication network as described above with respect to the wireless communication system 152 in FIG. 1. While the wireless communication system 208 is shown to be positioned on a roof of the automobile 200, in other examples the wireless communication system 208 could be located, fully or in part, elsewhere.

The camera 210 may be any camera (e.g., a still camera, a video camera, etc.) configured to capture images of the environment in which the automobile 200 is located. To this end, the camera 210 may take any of the forms described above with respect to the camera 134 in FIG. 1. While the camera 210 is shown to be mounted inside a front windshield of the automobile 200, in other examples the camera 210 may be mounted elsewhere on the automobile 200, either inside or outside the automobile 200.

The automobile 200 may include one or more other components in addition to or instead of those shown.

A control system of the automobile 200 may be configured to control the automobile 200 in accordance with a control strategy from among multiple possible control strategies. The control system may be configured to receive information from sensors coupled to the automobile 200 (on or off the automobile 200), modify the control strategy (and an associated driving behavior) based on the information, and control the automobile 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
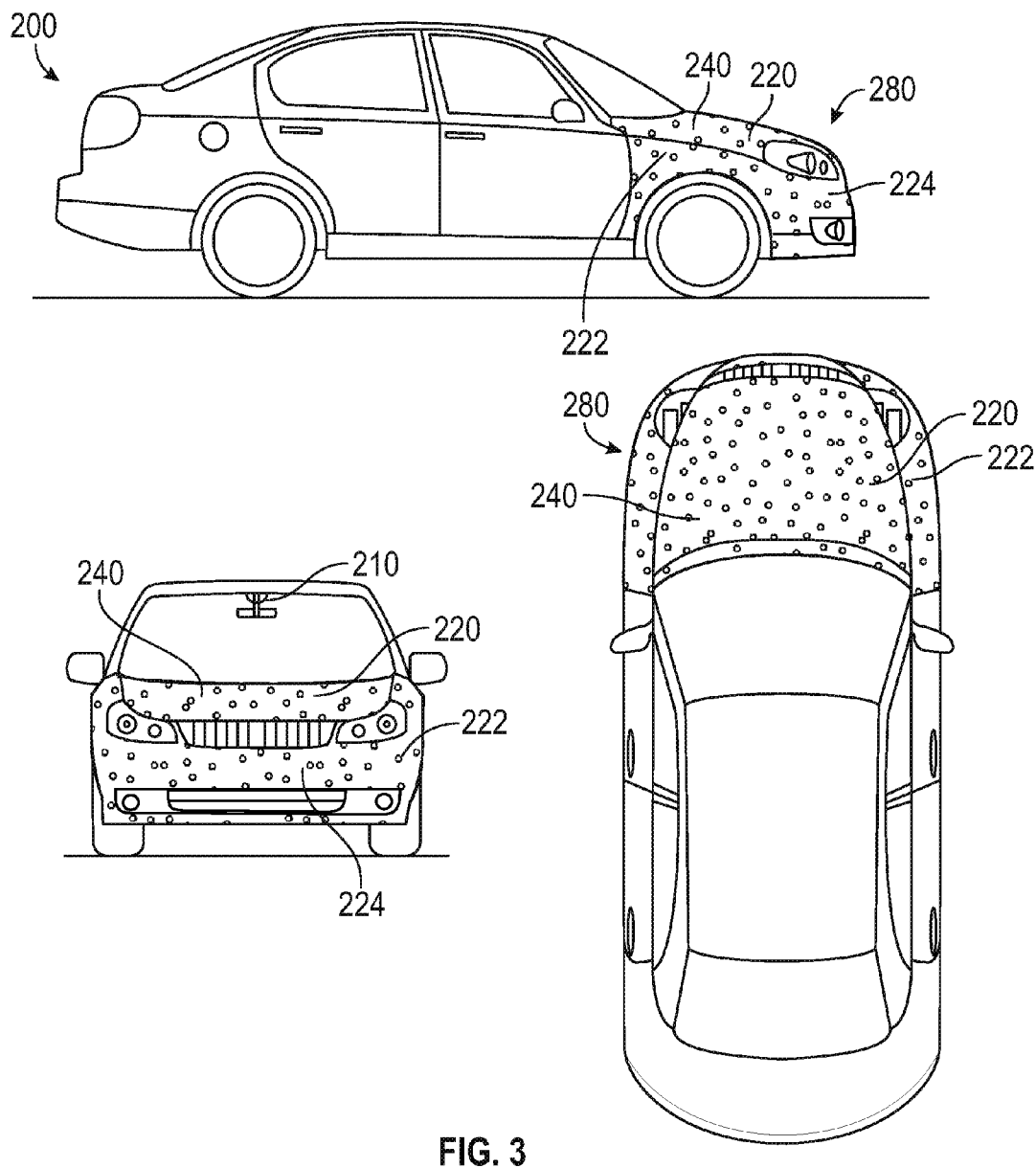
FIG. 3 illustrates a right side view, front view, and top view of the example automobile shown in FIG. 2 having adhesive system 280.
Figure 4:
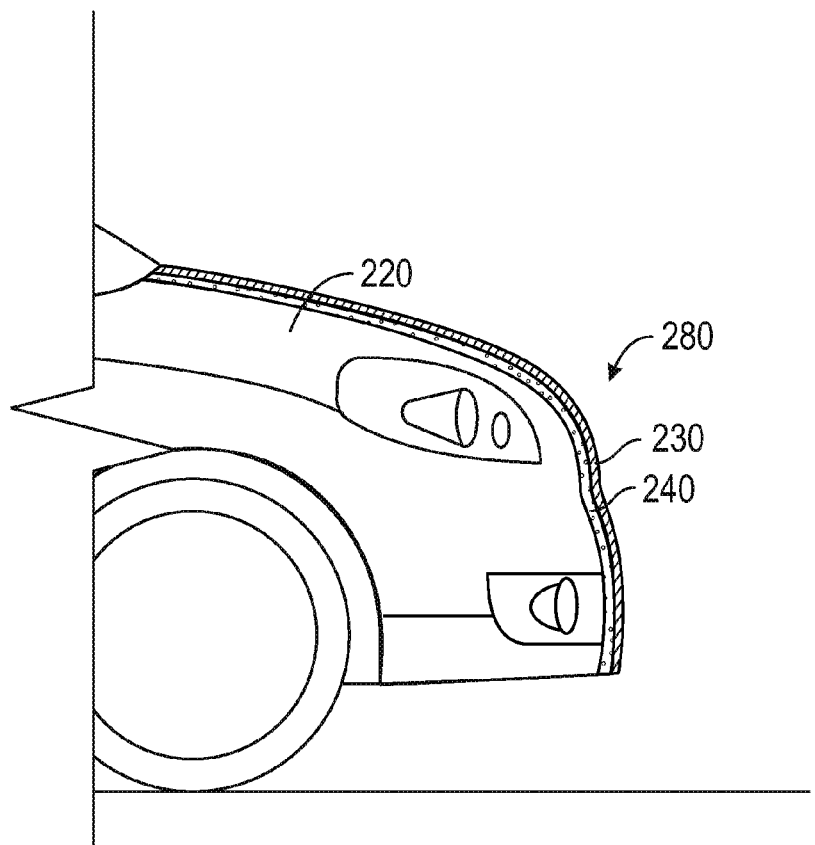
FIG. 4 is a partial cross sectional view the adhesive system 280 shown positioned on the front of the vehicle 200, including coating 230 positioned over adhesive layer 240.
Figure 5:
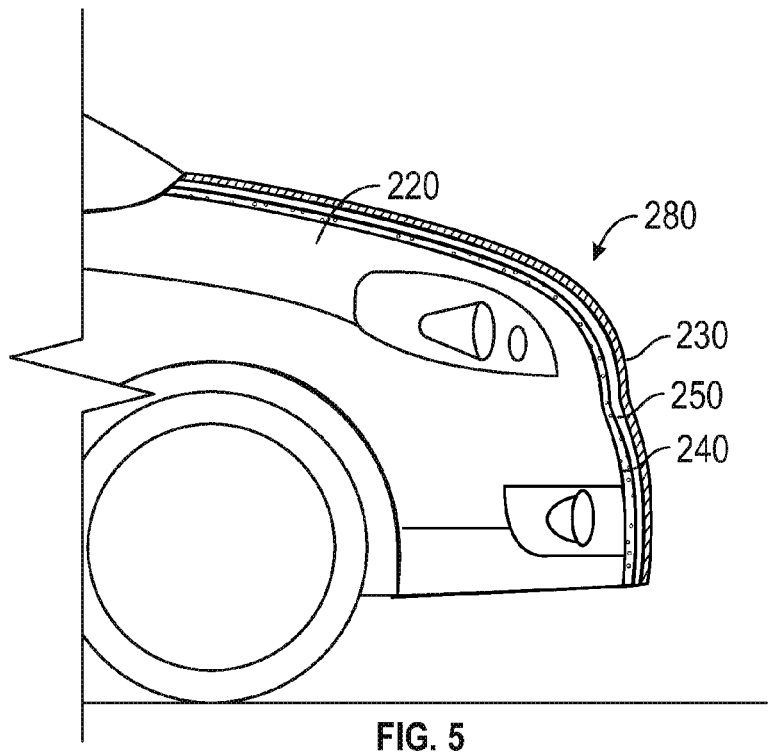
FIG. 5 is another partial cross-sectional view of the adhesive system 280 bumper system 10 shown in FIG. 4, with an air layer 250 positioned between coating 230 and adhesive layer 240.

FIG. 3 illustrates a right side view, front view, and top view of the example automobile 200 shown in FIG. 2 equipped with an adhesive system 280. In particular, the adhesive system 280 includes an adhesive layer 240 positioned on the hood 220 of vehicle 200, as well as on a front bumper 224 of the vehicle 200, and on the front side panels 222 of vehicle 200. In a preferred embodiment, the adhesive layer 240 covers the hood, front bumper, and front side panels. However, in some applications only the hood of the vehicle includes an adhesive layer. As shown in FIGS. 4 and 5, a coating 230 is positioned over the adhesive layer 240, however in FIG. 3, for illustrative purposes the adhesive system 280 is shown without coating 230.

The adhesive layer 240 may be positioned over the existing front hood, front bumper, and/or side panels of a vehicle. Thus, the adhesive layer 240 could be advantageously added onto an existing vehicle. Alternately, the adhesive layer 240 could be formed as part of a specifically designed hood, front bumper, and/or front side panel of a vehicle. In some applications, it may also be desirable to provide an adhesive layer on the windshield of the vehicle. For example, a layer of adhesive could be sandwiched within the windshield of the vehicle, as the windshield often takes considerable impact in the event of a collision with an object. Upon impact, the windshield glass could break, exposing the adhesive layer within the windshield.

FIG. 4 is a partial cross sectional view the adhesive system 280 shown positioned on the front of the vehicle 200. In particular, adhesive layer 240 is shown positioned over hood 220, and a coating 230 is positioned over adhesive layer 240. The coating 230 is designed to protect the hood 220 and adhesive layer 240 from road debris, dirt, water, and other environmental factors. The coating 230 may also carry the aesthetic surface finish of the vehicle's exterior. However, the coating 230 is a frangible or "eggshell-like" material that is designed to break into pieces during impact with a pedestrian to expose the adhesive layer 230. The exposed adhesive layer 230 bonds the pedestrian to the vehicle during initial impact with the pedestrian.

FIG. 5 is another partial cross-sectional view of the adhesive system 280 bumper system 10 shown in FIG. 4, with an air layer 250 positioned between coating 230 and adhesive layer 240. The air layer 250 may be useful for proper operation of the adhesive and also for helping to expose the adhesive layer 240 upon initial impact with a pedestrian.

Figure 6A:
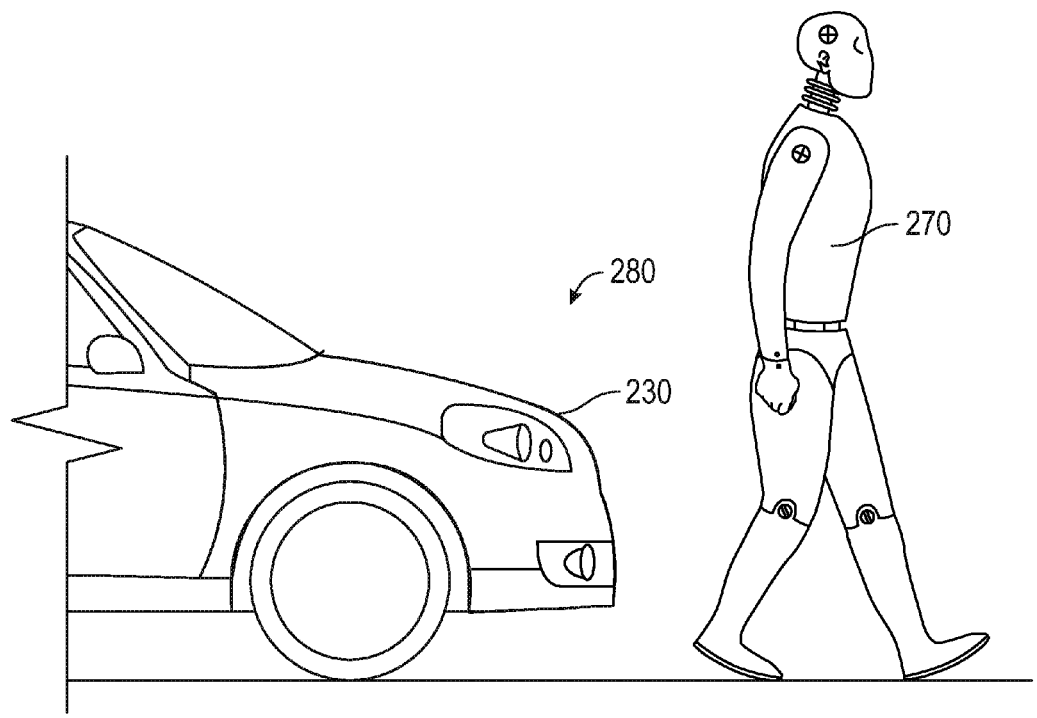
FIG. 6A is a side view of the front end of vehicle 200 approaching pedestrian 270.
Figure 6B:
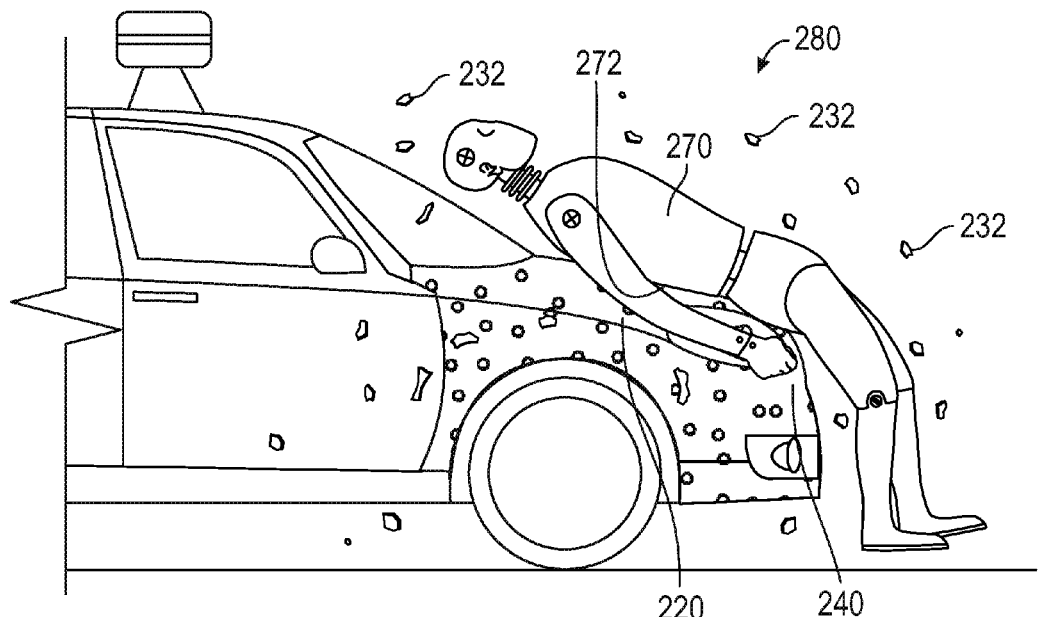
FIG. 6B is a side view of the front end of vehicle 200 shown in FIG. 6A during initial impact with pedestrian 270 with adhesive layers 220 and 240 exposed after the coating has been broken into pieces 232.

FIG. 6A is a side view of the front end of vehicle 200 and pedestrian 270. FIG. 6B is a side view of the front end of vehicle 200 shown in FIG. 6A during initial impact with pedestrian 270. In FIG. 6B, the coating 230 has been broken into pieces 232. Preferably, the pieces 232 are of a relatively small size, such as less than an inch in diameter, on average. The smaller pieces 232 help to expose the adhesive layers 220 and 240 so that they come into contact with, and bond to, the pedestrian 270. As shown in FIG. 6B, the back 272 of pedestrian 270 contacts adhesive layer 220 and the pedestrian 270 is thereby adhered to the vehicle during the initial impact.

Ideally, the adhesive layer on the front portion of the vehicle will be activated on contact and will be able to adhere to the pedestrian nearly instantaneously. This instantaneous action will constrain the movement of the pedestrian and carry the victim on the front end of the vehicle until the driver of the vehicle reacts to the incident and applies the brakes, bringing both vehicle and pedestrian to a safe stop. Thus, the adhesive layer may be formed of a quick acting adhesive. The adhesive may also comprise a contact adhesive or a pressure sensitive adhesive. In addition, in some embodiments the adhesive layer may be formed of a viscous layer of adhesive that flows to between broken pieces of the coating to expose the adhesive to the pedestrian. Furthermore, the adhesive in the adhesive layer may be a very sticky material and operate in a manner similar to flypaper, or double-sided duct tape. It is also desirable to have the adhesive in the adhesive layer release after a short period of time to allow for the removal of the pedestrian from the vehicle.

Figure 7A:
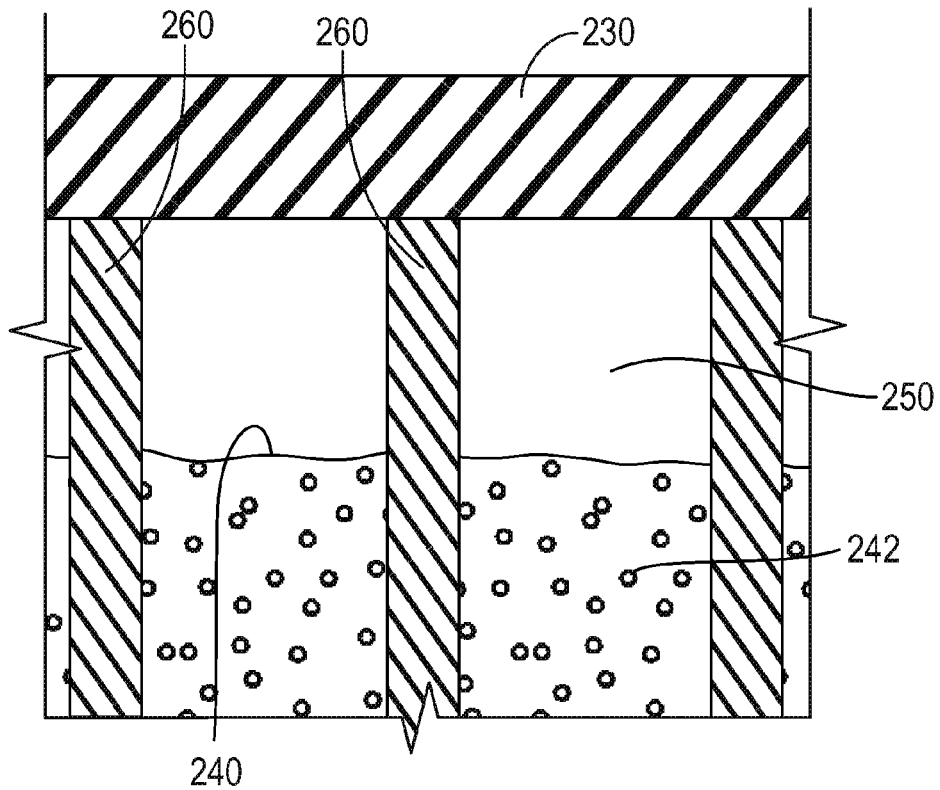
FIG. 7A is a partial cross-sectional side view of adhesive system 280 shown in FIG. 5.

FIG. 7A is a partial cross-sectional side view of adhesive system 280 shown in FIG. 5. Coating 230 is supported above adhesive layer 240 with supports 260 to form an air layer 250 between the coating 230 and the adhesive layer 240. It will be appreciated that the thickness of the coating 230, the air layer 250, and the adhesive layer 230 can be varied as desired. In some embodiments the thickness of the air layer 250 may be greater than or less than the thickness of the adhesive layer 240, and may also have a thickness that is equal to the thickness of the adhesive layer 240 to provide a desired amount of adhesive 242 and desired distance between adhesive layer 240 and coating 230.

Figure 7B:
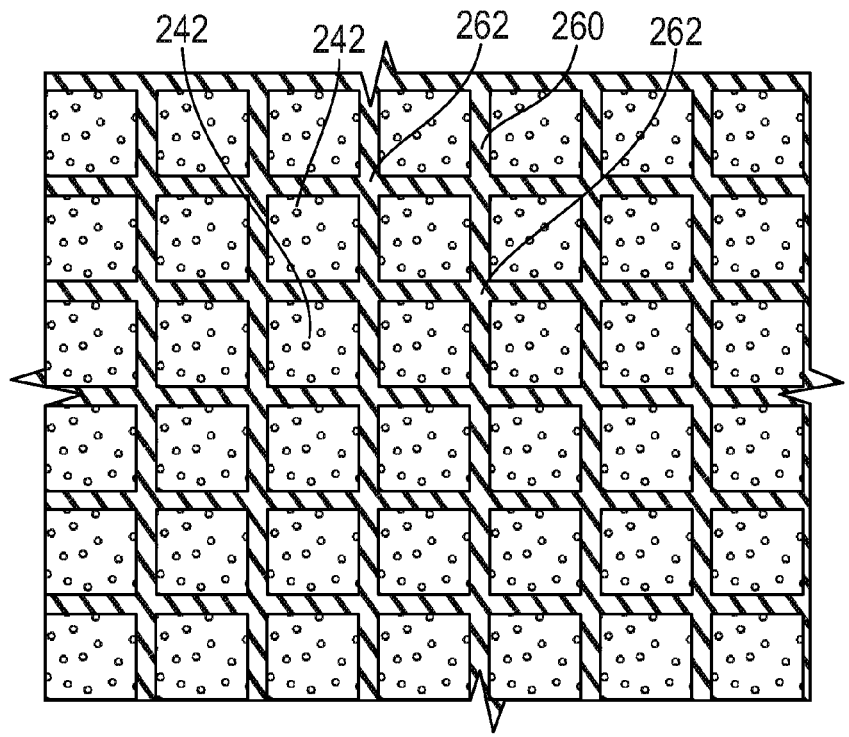
FIG. 7B is a partial cross-sectional top view of adhesive system 280 shown in FIG. 5, showing adhesive 242 within lattice supports 260.

FIG. 7B is a partial cross-sectional top view of adhesive system 280 shown in FIG. 5, showing adhesive 242 within lattice supports 260. As noted above, different types of adhesive 242 may be used. In addition, coating 230 may contact the adhesive 242 only at isolated points, such as intersections 262 of supports 260. In other words, in some embodiments only the point beneath intersections 262 may extend into the adhesive 242, to increase the area of the air layer to allow for potential flow of the adhesive 242 during initial impact with a pedestrian.

Figure 8:
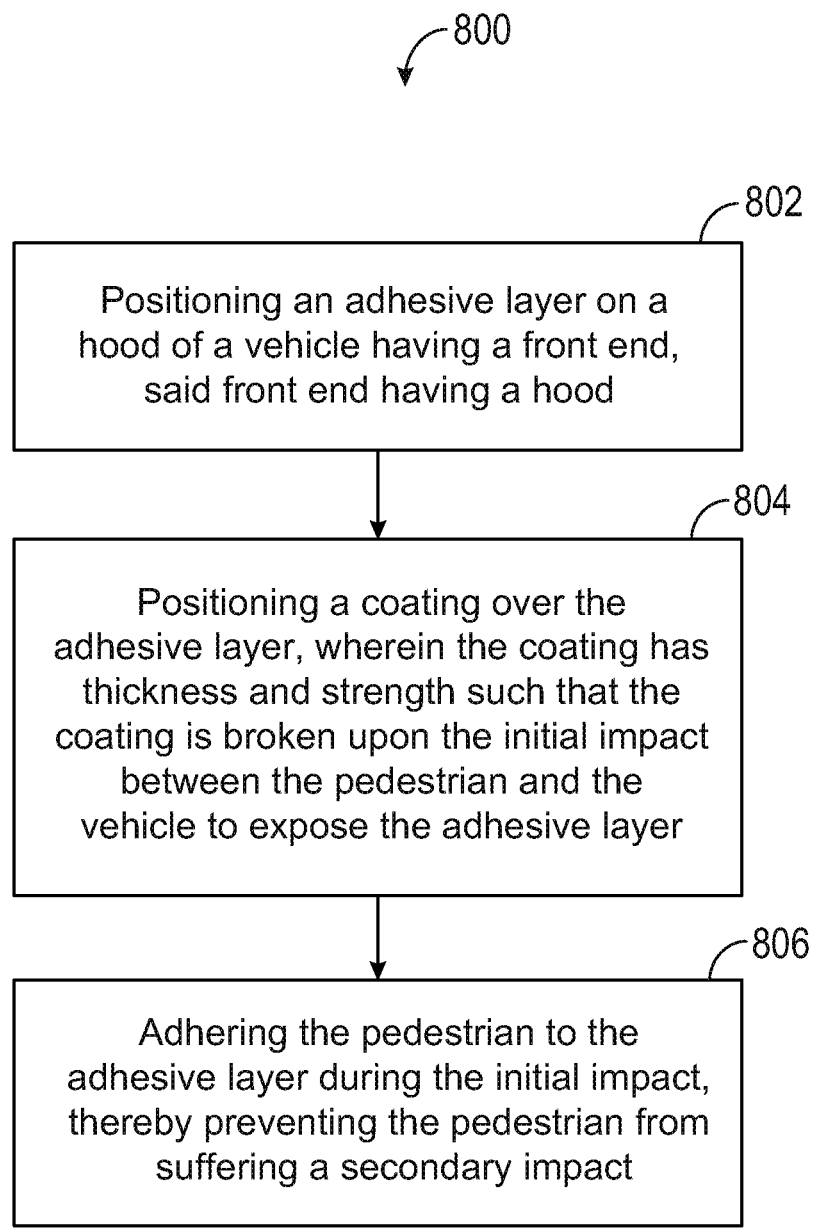
FIG. 8 is a method for protecting a pedestrian from a secondary impact, after an initial impact with a vehicle.

FIG. 8 is directed to method 800 for protecting a pedestrian from a secondary impact, after an initial impact with a vehicle, comprising the step 802 of positioning an adhesive layer on a hood of a vehicle having a front end, said front end having a hood, the step 804 of positioning a coating over the adhesive layer, wherein the coating has thickness and strength such that the coating is broken upon the initial impact between the pedestrian and the vehicle to expose the adhesive layer, and Step 806 of adhering the pedestrian to the adhesive layer during the initial impact, thereby preventing the pedestrian from suffering a secondary impact.

The disclosed embodiments provide a system and method for preventing the secondary impact of a pedestrian and a road surface or other object that may occur after an initial impact with a moving vehicle. The adhesive layer bonds or adheres to the pedestrian so that the pedestrian remains "stuck" to the vehicle and is not "thrown" from the vehicle where injuries may be caused by a secondary impact with the road surface or other object. Thus, the pedestrian is adhered to the vehicle and carried on the vehicle until the vehicle comes to a stop. Secondary pedestrian impacts lead to a large portion of severe injuries in road accidents. Therefore, the disclosed embodiments have the capability of significantly increasing safety and saving lives. This technology has the potential to make the biggest impact in extremely congested urban areas such as large cities due where there are a large number of pedestrians present.

The disclosed adhesive systems also help to prevent or reduce the possibility of a potential "tertiary" impact in which a pedestrian initially impacts a vehicle, is "thrown" from the vehicle where a secondary impact with the roadway occurs, and collides once more with a nearby vehicle travelling in the vicinity. Thus, the disclosed embodiments further help to prevent or reduce such tertiary impacts which could lead to severe injury or even death, providing for additional pedestrian safety.

It will be appreciated that the adhesive systems described above could be used with a wide variety of different vehicles. However, it may be particularly advantageous to provide a vehicle having an autonomous mode of operation with the above-described adhesive systems. Furthermore, the adhesive systems have been described with respect to a vehicle colliding with a pedestrian. The term "pedestrian" as used herein includes any kind of person. However, the adhesive systems may be used for collisions between a vehicle and other colliding objects as well. For example, as used herein, a "colliding object" may include a pedestrian, as well, as other objects such as a bicycle or animal.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A system for protecting a colliding object from a secondary impact, after an initial impact with a vehicle, comprising:
    a vehicle having a front end,
    an adhesive layer positioned on the front end of the vehicle;
    a coating positioned over the adhesive layer;
    wherein one or more layers of air are positioned between the coating and the adhesive layer; and
    wherein, upon the initial impact between the colliding object and the vehicle, the coating is broken exposing the adhesive layer to adhere the colliding object to the adhesive layer during the initial impact.

2. The system of claim 1, wherein the adhesive layer comprises a quick acting adhesive.

3. The system of claim 1, wherein the adhesive layer comprises a contact adhesive.

4. The system of claim 1, wherein the adhesive layer comprises a pressure sensitive adhesive.

5. The system of claim 1, wherein the adhesive layer comprises a viscous layer of adhesive.

6. The system of claim 1, wherein the adhesive layer comprises a releasable adhesive so that the colliding object may be decoupled from the adhesive layer after a period of time.

7. The system of claim 1, wherein the coating is comprised of a frangible material.

8. The system of claim 1, wherein the coating contacts the adhesive layer at isolated locations to provide the one or more layers of air.

9. The system of claim 1, wherein a thickness of the one or more layers of air is greater than a thickness of the adhesive layer.

10. The system of claim 1, wherein a thickness of the one or more layers of air is equal to a thickness of the adhesive layer.

11. The system of claim 1, wherein the adhesive layer and the coating extends beyond a hood and onto front side panels of the vehicle.

12. The system of claim 1, wherein a second adhesive layer extends over a vehicle bumper positioned on the front end of the vehicle, and a second coating is positioned over the second adhesive layer.

13. The system of claim 1, wherein a lower surface of the coating is in contact with the one or more layers of air prior to the initial impact.

14. The system of claim 1, the adhesive layer comprises a viscous layer of adhesive that, upon impact, is caused to flow between pieces of the broken coating to come into contact with the colliding object.

15. The system of claim 14, wherein the viscous layer of adhesive is positioned within a lattice structure that supports the coating above the viscous layer of adhesive.

16. A method for protecting a colliding object from a secondary impact, after an initial impact with a vehicle, comprising the steps of:
    positioning an adhesive layer on a hood of a vehicle having a front end;
    positioning a coating over the adhesive layer, wherein the coating has a thickness and strength such that the coating is broken upon the initial impact between the colliding object and the vehicle to expose the adhesive layer;
    positioning one or more layers of air between the adhesive layer and the coating; and
    adhering the colliding object to the adhesive layer during the initial impact, thereby preventing the colliding object from suffering the secondary impact.

17. The method of claim 16, further including the step of releasing the colliding object from the adhesive layer.

18. The method of claim 16, further including the steps of:
    positioning a second adhesive layer on a vehicle bumper positioned on a front end of the vehicle;
    positioning a second coating over the second adhesive layer, wherein the second coating has a thickness and strength such that the second coating is broken upon the initial impact between the colliding object and the vehicle to expose the second adhesive layer; and
    adhering the colliding object to the second adhesive layer during the initial impact.

19. The method of claim 16, wherein a lower surface of the coating is in contact with the one or more layers of air prior to the initial impact.

* * * * *